(12) United States Patent
Berndorfer et al.

(10) Patent No.: US 9,517,809 B2
(45) Date of Patent: Dec. 13, 2016

(54) SCOOTER

(71) Applicant: Scoot & Ride GmbH, Grieskirchen (AT)

(72) Inventors: Wolfgang Berndorfer, Natternbach (AT); Robert Kirschschlager, Leonding (AT)

(73) Assignee: Scoot & Ride GmbH, Grieskirchen (AT)

( * ) Notice: Subject to any disclaimer, the term of this patent is extended or adjusted under 35 U.S.C. 154(b) by 0 days.

(21) Appl. No.: 14/986,043

(22) Filed: Dec. 31, 2015

(65) Prior Publication Data
US 2016/0107716 A1    Apr. 21, 2016

Related U.S. Application Data

(62) Division of application No. 14/366,428, filed as application No. PCT/AT2012/000317 on Dec. 12, 2012, now Pat. No. 9,254,883.

(30) Foreign Application Priority Data

Dec. 22, 2011    (AT) .............................. A 50019/2011

(51) Int. Cl.
*B62K 13/08*    (2006.01)
*B62K 3/00*    (2006.01)
(Continued)

(52) U.S. Cl.
CPC .............. *B62K 13/08* (2013.01); *B62K 3/002* (2013.01); *B62K 13/00* (2013.01); *B62K 15/006* (2013.01); *B62K 15/008* (2013.01)

(58) Field of Classification Search
CPC ......... B62K 9/00; B62K 15/00; B62K 15/006; B62K 15/008; B62K 17/00; B62K 13/00; B62K 13/08; B62K 3/02; B62K 3/002
(Continued)

(56) References Cited

U.S. PATENT DOCUMENTS 1,379,305 A * 5/1921 Johns ...................... B62K 9/02
                                                    280/7.1
1,838,877 A    12/1931 Stevens
(Continued)

FOREIGN PATENT DOCUMENTS

AT            507557 A4    6/2010
CN        201694317 U    1/2011
(Continued)

OTHER PUBLICATIONS

Office Action issued Feb. 27, 2015 in Application No. 14/366,428 by Berndorfer.

*Primary Examiner* — John Walters
(74) *Attorney, Agent, or Firm* — Panitch Schwarze Belisario & Nadel LLP

(57) ABSTRACT

A scooter or bicycle including a chassis is provided. The chassis has a guide bearing for a steering column holding a front wheel and for a supporting arm for a pivotable footboard having a rear wheel. The supporting arm includes a seat. The supporting arm, connected to the pivotable footboard, is pivotally coupled to the guide bearing. A portion of the chassis including the supporting arm and the pivotable footboard is transferable from a first usage position as a scooter, in which the pivotable footboard is substantially parallel with the road surface, by a rotation of 180° around an axis of the supporting arm into a usage position as a bicycle, in which the pivotable footboard supports the supporting arm facing rearwardly from the steering column. The seat is arranged on a side of the supporting arm facing away from the pivotable footboard.

5 Claims, 2 Drawing Sheets

(51) Int. Cl.
*B62K 13/00* (2006.01)
*B62K 15/00* (2006.01)

(58) Field of Classification Search
USPC .......................... 280/87.01, 87.021, 87.041,
87.042, 280/87.043, 87.05, 7.1, 7.15
See application file for complete search history.

(56) References Cited

U.S. PATENT DOCUMENTS

| | | | | |
|---|---|---|---|---|
| 4,657,270 | A * | 4/1987 | Allen | B62K 13/00 280/282 |
| D524,699 | S * | 7/2006 | Kurth | D12/112 |
| 8,500,134 | B2 * | 8/2013 | Tzoreff | B62K 3/002 280/282 |
| 2012/0187650 | A1* | 7/2012 | Chen | B62K 9/00 280/263 |
| 2015/0042053 | A1 | 2/2015 | Berndorfer et al. | |

FOREIGN PATENT DOCUMENTS

| | | |
|---|---|---|
| CN | 201980351 U | 9/2011 |
| DE | 202006017904 U1 | 3/2007 |
| SU | 988637 A1 | 1/1983 |
| TW | 200624320 A | 7/2006 |
| WO | 03093093 A1 | 11/2003 |

\* cited by examiner

SCOOTER

CROSS-REFERENCE TO RELATED APPLICATIONS

This application is a continuation of co-pending U.S. patent application Ser. No. 14/366,428 filed Sep. 25, 2014, which is a national phase application of PCT Application No. PCT/AT2012/000317 filed Dec. 12, 2012, which was published in the German language on Jun. 27, 2013, under International Publication No. WO 2013/090953 A1, and which claims priority to Austrian Patent Application No. A 50019/2011 filed Dec. 22, 2011, the disclosures of which are incorporated herein by reference.

BACKGROUND OF THE INVENTION

The invention relates to a scooter comprising a chassis which has a guide bearing for a steering column holding the front wheel and a supporting arm, which includes a seat, for a pivotable footboard which is provided with a rear wheel.

Known scooters comprise a chassis which substantially has a guide bearing for a steering column holding the front wheel and footboard provided with a rear wheel, which is either rigidly connected to the guide bearing or is coupled to same so as to be pivotable from a locked usage position into a transport position. For equipping scooters of this type with a seat it has already been proposed (AT 507 557, DE29819701U) to fix a seat to the supporting arm that connects the footboard with the guide bearing. However, on the one hand this involves additional constructional measures, on the other hand the use of the scooter in a standing position is limited.

BRIEF SUMMARY OF THE INVENTION

The invention is therefore based on the object to configure a scooter of the above-described type with comparatively simple constructional means such that it may optionally be used with the seat, without affecting the use of the scooter with a footrest on the footboard.

The object is achieved by the invention in that the supporting arm connected to the footboard is coupled to the guide bearing so as to be pivotable about an axis that extends through the center of the rear wheel.

These measures yield two possible usage positions for the chassis portion, which is formed by the supporting arm and the footboard, relative to the guide bearing and the steering column. As this chassis portion is pivoted by 180° about an axis for those two usage positions, the axis extending through the center of the rear wheel, the rear wheel adopts a corresponding position of use in both usage positions, which represents a constructional requirement for a consistent handling of the scooter in those two usage positions owing to a corresponding wheelbase.

In the position when used as a conventional scooter, the footboard runs substantially parallel to the road surface, so that the foot can be placed on the footboard in the usual manner. Upon a 180° rotation of the supporting arm for the footboard, the footboard projects upwardly from the rear wheel and supports the supporting arm, on which the seat is provided, now projecting rearwardly from the steering column. For positioning the seat, the supporting arm may be mounted to be rotatable about its axis. Particularly favorable constructional conditions are obtained, however, if the seat is arranged on the side of the supporting arm that faces away from the footboard. The scooter can thus serve as a training bicycle for a user sitting on same, whereby the legs can be pushed off from the ground laterally beside the supporting arm of the chassis, namely without being obstructed by the footboard.

The chassis portion formed by the supporting arm and the footboard can be locked in the two usage positions relative to the guide bearing by means of a locking device, e.g. a locking pin or a clamping screw. To this end, the locking device is to be configured such that an unintended unlocking during the use of the scooter is prevented.

Particularly advantageous constructional conditions are obtained if the supporting arm and the footboard enclose the same angle with the pivot axis. Thus, it is ensured that the footboard and the supporting arm have an approximately identical length, thereby guaranteeing advantageous use conditions, especially if it is considered that the pivot bearing for the supporting arm is preferably provided on the guide bearing for the steering column at a ground clearance that is adapted to the height of the seat.

Although the chassis portion formed of the supporting arm and the footboard is mounted about a pivot axis extending through the center of the rear wheel it is possible to configure the scooter collapsible for the transport thereof if the footboard is mounted on the supporting arm to be pivotable about an axis parallel to the rear wheel axle from a locked usage position into a transport position. If, in the usage position as an ordinary scooter, the footboard is pivoted towards the supporting arm the rear wheel is placed against the supporting arm in the region of the pivot bearing for the supporting arm, resulting in a compact transport position.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
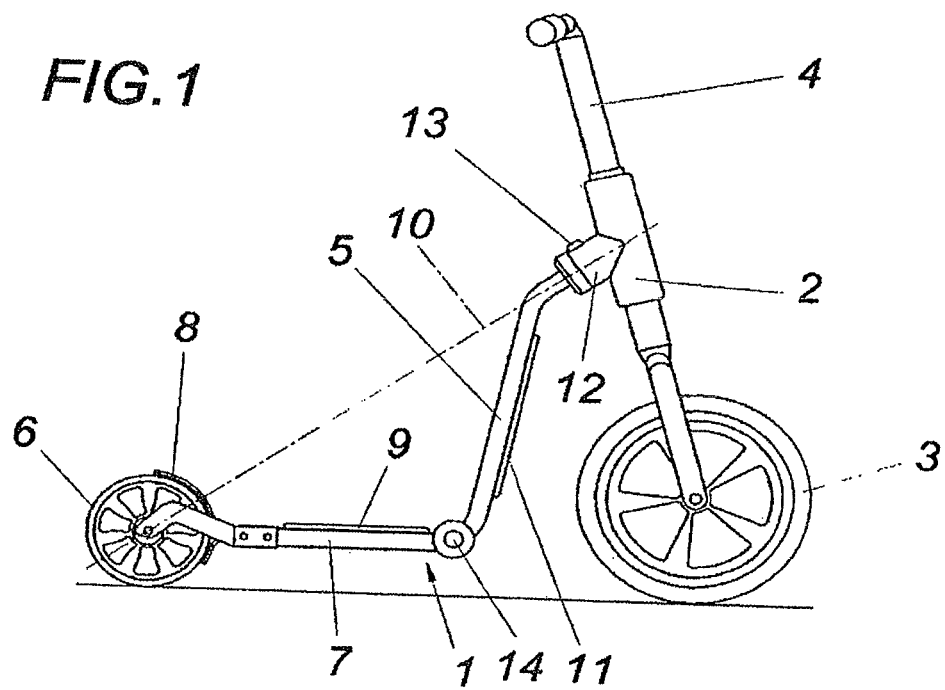
FIG. 1 shows a simplified lateral view of a scooter according to the invention.

The scooter according to the illustrated embodiment comprises a chassis 1 which has a guide bearing 2 for a steering column 4 holding a front wheel 3 and a supporting arm 5 for a footboard 7 which is provided with a rear wheel 6. A cover for the rear wheel 8 may, according to FIG. 1, be used in a conventional manner as a braking device. To improve the non-slip safety, the footboard 7 may be provided with a foot layer 9 which prevents the foot from slipping off the footboard 7.

Figure 2:
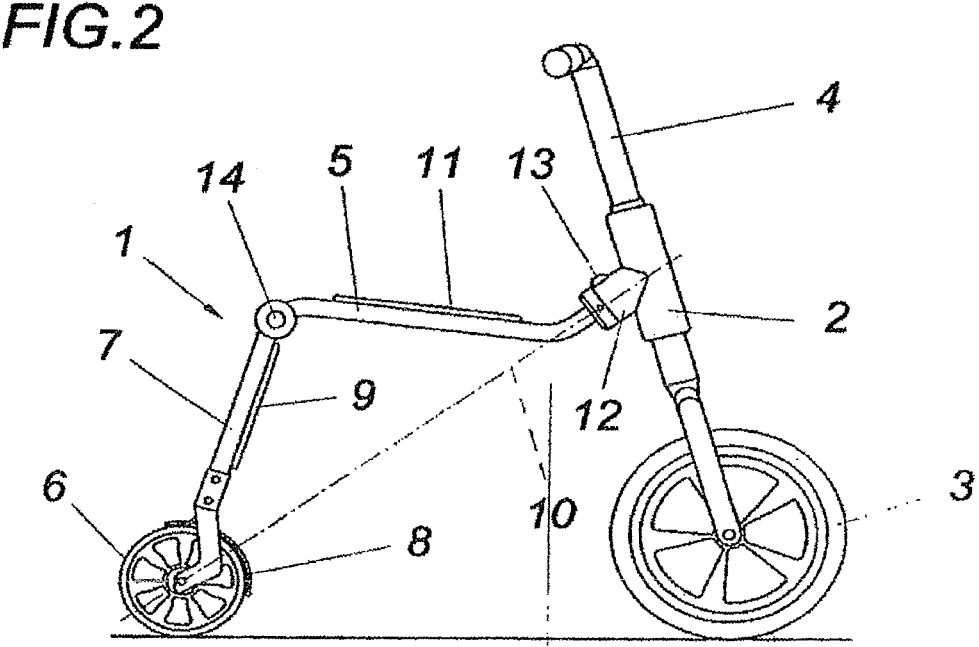
FIG. 2 shows an illustration of the scooter corresponding to FIG. 1, but in the position used as a training bicycle.

The supporting arm 5 is coupled, in a pivotably adjustable manner, to the guide bearing 2 about an axis 10 extending through the center of the rear wheel 6. The pivoting adjustment about the pivot axis 10 allows to pivot the chassis portion, formed of supporting arm 5 and footboard 7, by 180° from a position for the usage of the footboard, as shown in FIG. 1, into a position in which a seat 11 may be used, as shown in FIG. 2, the seat being provided on the side of the supporting arm 5 facing away from the footboard 7. A user sitting on the seat 11 can thus use the scooter as a training bicycle by pushing his legs off from the road surface on both sides of the supporting arm 5. The footboard 7 projecting upwardly from the rear wheel 6 as a result of the 180° rotation does not obstruct the leg movement of the user of the training bicycle. As can be learned from the comparison of FIG. 1 and FIG. 2 the rear wheel 6 maintains its position in both usage positions of the scooter, so that the wheelbase is not changed and corresponding driving and steering properties are ensured for both usage positions. By a ground clearance of the pivot bearing 12 of the supporting arm 5 on the guide bearing 2 in correspondence with the height of the seat it is possible to predetermine particularly advantageous constructional conditions as, in this case, the supporting arm 5 with the seat 11 can extend approximately parallel to the road surface.

A stable handling of the scooter requires the locking of the chassis 1 in both usage positions. To this end, the pivot bearing 12 for the supporting arm 5 may be provided with a locking device 13, e.g. an ordinary lock pin. The actuating mechanism of the locking device 13 may ensure in a conventional manner that an unintended unlocking during the use of the scooter is excluded.

Figure 3:
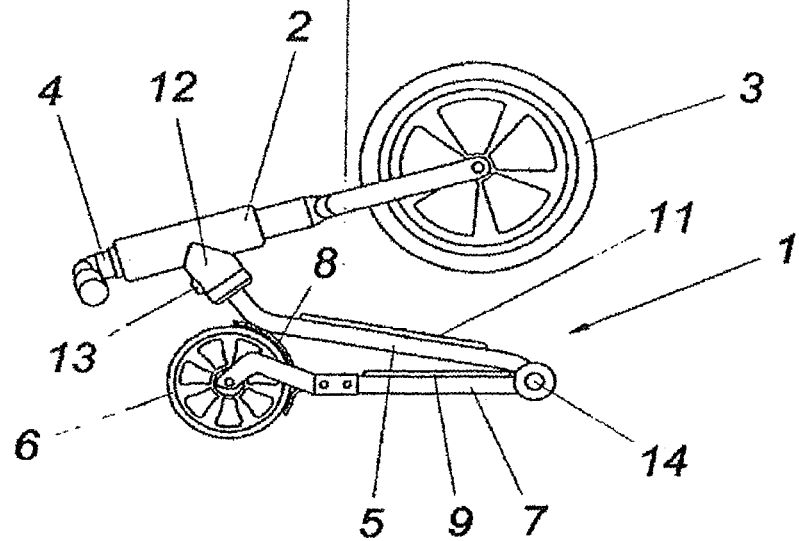
FIG. 3 is a cross-section taken along line 3-3 of FIG. 2A or FIG. 2B.

As can be seen in FIG. 3, it is possible despite the coupling of the supporting arm 5 on the guide bearing 2 about an axis 10 extending through the rear wheel axle to obtain a collapsed transport position for the scooter. To this end, a joint 14 may be provided between the supporting arm 5 and the footboard 7, which can be locked at least in the usage positions of the scooter. Upon releasing the locking mechanism the footboard 7 may be pivoted towards the supporting arm 5 until the rear wheel 6 rests against the supporting arm 5. Depending on the pivoted position of the supporting arm 5 on the pivot bearing 12 different transport positions become possible. One thereof is shown in FIG. 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A scooter or bicycle comprising:
   a chassis (1) which has a guide bearing (2) for a steering column (4) holding a front wheel (3) and for a supporting arm (5) for a pivotable footboard (7) having a rear wheel (8), the supporting arm (5) comprising a seat (11),
   wherein the supporting arm (5) is connected to the pivotable footboard (7) and is pivotally coupled to the guide bearing (2),
   wherein a portion of the chassis comprising the supporting arm (5) and the pivotable footboard (7) is transferable from a first usage position as a scooter, in which the pivotable footboard (7) extends substantially parallel with a road surface, by a rotation of 180° around an axis of the supporting arm (5) into a second usage position as a bicycle, in which the pivotable footboard (7) supports the supporting arm (5) facing rearwardly from the steering column, the seat (11) being arranged on a side of the supporting arm (5) facing away from the pivotable footboard (7).

2. The scooter or bicycle according to claim 1, wherein the portion of the chassis comprising the supporting arm (5) and the pivotable footboard (7) is lockable by a locking device (13) in both of the first and second usage positions with respect to the guide bearing (2).

3. The scooter or bicycle according to claim 1, wherein the axis of the supporting arm (5) is a pivot axis (10) and wherein, with respect to the pivot axis (10), the supporting arm (5) and the pivotable footboard (7) enclose a same angle.

4. The scooter or bicycle according to claim 1, wherein the supporting arm (5) and the pivotable footboard (7) have a same length.

5. The scooter or bicycle according to claim 1, wherein a lockable joint (14) is arranged between the supporting arm (5) and the pivotable footboard (7).

\* \* \* \* \*